(12) United States Patent
Kurihara

(10) Patent No.: US 12,731,855 B2
(45) Date of Patent: Sep. 8, 2026

(54) BATTERY PACK

(71) Applicant: SANYO Electric Co., Ltd., Daito (JP)

(72) Inventor: Hidemi Kurihara, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 606 days.

(21) Appl. No.: 17/630,745

(22) PCT Filed: Jun. 30, 2020

(86) PCT No.: PCT/JP2020/025628
§ 371 (c)(1),
(2) Date: Jan. 27, 2022

(87) PCT Pub. No.: WO2021/020003
PCT Pub. Date: Feb. 4, 2021

(65) Prior Publication Data

US 2022/0320678 A1 Oct. 6, 2022

(30) Foreign Application Priority Data

Jul. 29, 2019 (JP) ................................ 2019-139103

(51) Int. Cl.
*H01M 50/358* (2021.01)
*H01M 50/107* (2021.01)
(Continued)

(52) U.S. Cl.
CPC ....... *H01M 50/358* (2021.01); *H01M 50/107* (2021.01); *H01M 50/213* (2021.01);
(Continued)

(58) Field of Classification Search
CPC ............ H01M 50/213; H01M 50/227; H01M 50/271; H01M 50/367; H01M 50/24;
(Continued)

(56) References Cited

U.S. PATENT DOCUMENTS

2005/0079408 A1 4/2005 Hirano
2006/0057456 A1* 3/2006 Hong .................. H01M 50/117
429/72

(Continued)

FOREIGN PATENT DOCUMENTS

CN 1592977 A 3/2005
EP 2 738 834 A1 6/2014

(Continued)

OTHER PUBLICATIONS

WO-2013001585-A1—English Translation (Year: 2025).*

(Continued)

*Primary Examiner* — Allison Bourke
*Assistant Examiner* — Bethany C Garcia
(74) *Attorney, Agent, or Firm* — WHDA, LLP

(57) ABSTRACT

In a battery pack, an exterior case accommodates therein a core pack including battery blocks coupled to one another. Each battery cell includes battery cells held at predetermined positions by a battery holder. Each battery block includes exhaust passage passing through the battery holder. The core pack has a valve-side end surface arranged at a first end thereof, and includes a partition wall between battery blocks coupled to one another. The partition wall has a through-hole opening at a position facing the exhaust passage. In the core pack, the exhaust passage formed in each battery block and the through-hole formed in partition wall are arranged on a straight line to constitute an exhaust duct for the exhaust gas. The exhaust gas discharged from the valve-side end surface arranged at the first end passes through the exhaust duct and then is discharged from an exhaust portion to an outside.

7 Claims, 6 Drawing Sheets

(51) Int. Cl.
*H01M 50/213* (2021.01)
*H01M 50/244* (2021.01)
*H01M 50/271* (2021.01)
*H01M 50/317* (2021.01)

(52) U.S. Cl.
CPC ....... *H01M 50/244* (2021.01); *H01M 50/271* (2021.01); *H01M 50/317* (2021.01)

(58) Field of Classification Search
CPC ............. H01M 50/249; H01M 50/293; H01M 50/204; H01M 50/233; H01M 50/289; H01M 50/383; H01M 50/287; H01M 50/529; H01M 50/581; H01M 50/593; H01M 2220/20; H01M 2200/20; H01M 50/107; H01M 50/358; H01M 50/244; H01M 50/28; H01M 50/317; H01M 10/613; H01M 10/6554; H01M 10/0422; H01M 10/65–6595; H01M 10/6557; H01M 50/20–298; H01M 50/30–394; H01M 50/35; H01M 10/6568; H01M 10/6562; H01M 10/61; H01M 50/517; H01M 50/578; H01M 50/26; H01M 50/258; B60L 50/64; B60L 58/26; Y02P 70/50; Y02E 60/10
See application file for complete search history.

(56) References Cited

U.S. PATENT DOCUMENTS

2008/0026284 A1* 1/2008 Fujii .................. H01M 10/613 429/120
2010/0247990 A1 9/2010 Ugaji et al.
2011/0212348 A1* 9/2011 Yasui .................. H01M 50/227 429/7
2012/0270080 A1* 10/2012 Hermann .......... H01M 50/3425 429/56
2015/0249278 A1* 9/2015 Park .................... H01M 50/264 429/82
2019/0140233 A1* 5/2019 Yeh ..................... H01M 50/213
2020/0317357 A1* 10/2020 Demont .............. H01M 50/358

FOREIGN PATENT DOCUMENTS

JP 10-162795 A 6/1998
JP 2001-196039 A 7/2001
JP 2003-162993 A 6/2003
JP 3627584 B2 * 3/2005 .......... H01M 50/325
JP 2005322434 A * 11/2005
WO 2010/007720 A1 1/2010
WO WO-2013001585 A1 * 1/2013 .......... H01M 50/367
WO 2013/018283 A1 2/2013

OTHER PUBLICATIONS

JP-3627584-B2—English Translation (Year: 2025).*
JP-2005322434-A—English translation, accessed via PE2E Search, Apr. 2026 (Year: 2026).*
English Translation of Chinese Office Action dated Feb. 22, 2023, issued in counterpart CN application No. 202080048017.8. (5 pages).
International Search Report dated Sep. 1, 2020, issued in counterpart International Application No. PCT/JP2020/025628. (2 pages).

* cited by examiner

BATTERY PACK

TECHNICAL FIELD

The present invention relates to a battery pack accommodating therein battery cells, and particularly relates to a battery pack with a high capacity which includes battery blocks connected in series or in parallel in which each battery block includes the battery cells held at predetermined positions by a battery holder.

BACKGROUND ART

A battery pack including battery cells accommodated in a case is used as a power source for portable electric device used in cordless. In this battery pack, the battery cells are connected in series or in parallel to increase a capacity. In recent years, a battery pack used as a power source of an electric device has been further required to have a high output, and employed a non-aqueous electrolytic secondary battery such as a lithium ion battery having excellent efficiency per unit volume.

The lithium ion battery has a high output, but has an internal pressure increasing due to some reasons. In order to ensure safety against the increase in the internal pressure of the battery, the battery includes a discharge valve configured to open at a predetermined pressure to prevent rupture. When the discharge valve opens, the battery is in an abnormal heat generation state, and ejects a high-temperature gas vigorously from the discharge valve. A battery pack including the exterior case having a hole therein for discharging exhaust gas discharged from a discharge valve to outside has been developed (see PTL 1)

A battery pack in which air permeability inside the battery pack is improved by providing through-holes in an exterior case and heat is prevented from remaining in the case by facilitating dissipation of heat has been developed (see PTL 2).

CITATION LIST

Patent Literature

PTL 1: Japanese Patent Laid-Open Publication No. 2001-196039

PTL 2: Japanese Patent Laid-Open Publication No. 10-162795

SUMMARY OF THE INVENTION

Technical Problem

In a conventional battery pack, a hole is provided in an exterior case, and exhaust gas ejected from a discharge valve is discharged to outside. In this battery pack, it is difficult to safely discharge the high-temperature exhaust gas vigorously ejected from a battery cell to outside. In particular, since the exhaust gas ejected from the discharge valve of a lithium ion battery that is a non-aqueous electrolyte secondary battery is vigorously ejected at an abnormally high temperature higher than 400° C., the exhaust gas thermally may melt the exterior case and the exhaust gas is ejected to the outside of the case in a high-temperature state and ignited, significantly impairing safety.

The present invention has been developed in order to prevent the above adverse effects, and a main object of the present invention is to provide a battery pack that prevents a decrease in safety due to a high-temperature exhaust gas ejected from an opened discharge valve.

Solution to Problem

A battery pack according to an aspect of the present invention includes battery blocks each including battery cells and a battery holder positioning the battery cells at predetermined positions, and an exterior case accommodating therein a core pack including the battery blocks coupled to one another in an axial direction of the battery cells. Each battery cell includes a discharge valve configured to opens when an internal pressure of the battery cell exceeds a predetermined pressure. The exterior case has an exhaust portion through which exhaust gas discharged from the discharge valve to an outside of the exterior case. Each of the battery blocks has an exhaust passage passing through the battery holder and extending in a longitudinal direction of the battery cells. A valve-side end surface of each battery cell at which the discharge valve is disposed is arranged at a first end of the core pack. The core pack includes a partition wall provided between battery blocks coupled to one another. The partition wall insulates battery cells from each other. The partition wall has a through-hole provided therein. The through-hole opens at a position facing the exhaust passage provided in the battery holder. The exhaust passage provided in each of the battery blocks and the through-hole provided in the partition wall are arranged on a straight line and form an exhaust duct for the exhaust gas in the core pack while the battery blocks are coupled to one another. The exterior case is configured to cause the exhaust gas discharged from the valve-side end surface arranged at the first end of the core pack to pass through the exhaust duct and to be discharged from the exhaust portion to an outside of the exterior case.

Advantageous Effect of Invention

The battery pack of the present invention enhances safety by suppressing adverse effects caused by high-temperature exhaust gas ejected from the discharge valve of the battery cell.

BRIEF DESCRIPTION OF DRAWINGS

FIG. 2 is a vertical longitudinal sectional view of the battery pack illustrated in FIG. 1.

FIG. 6 is an exploded perspective view of a battery block illustrated in FIG. 5.

DESCRIPTION OF EMBODIMENTS

Figure 1:
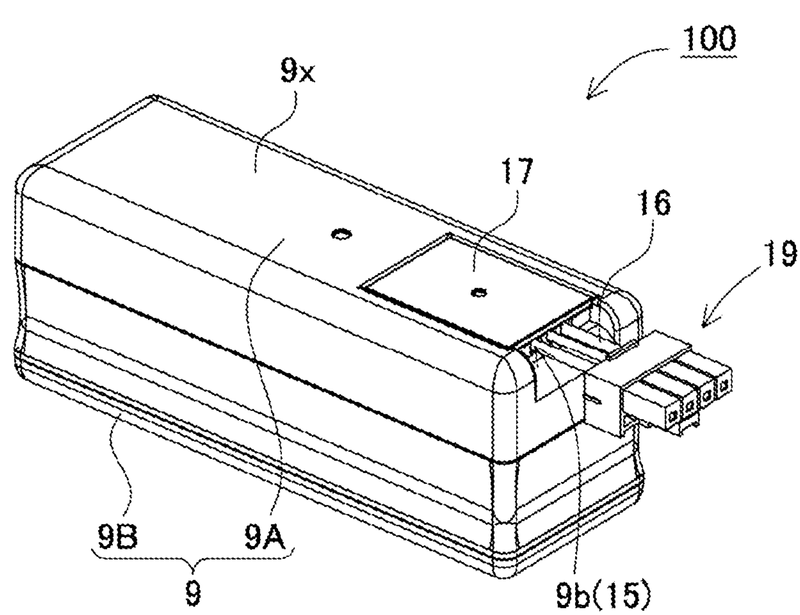
FIG. 1 is a perspective view of a battery pack according to an exemplary embodiment of the present invention.

A battery pack of a first exemplary embodiment of the present invention is a battery pack including battery blocks each including battery cells and a battery holder positioning the battery cells at predetermined positions, and an exterior case accommodating therein a core pack including the battery blocks coupled to one another in an axial direction of the plurality of battery cells. Each of the battery cells includes a discharge valve configured to opens when an internal pressure of each battery cell exceeds a predetermined pressure. The exterior case has an exhaust portion through which exhaust gas discharged from the discharge valve to an outside of the exterior case. Each of the battery blocks has an exhaust passage passing through the battery holder and extending in a longitudinal direction of the battery cells. A valve-side end surface of each of the battery cells at which the discharge valve is disposed is arranged at a first end of the core pack. The core pack includes a partition wall provided between battery blocks coupled to one another. The partition wall insulates opposing battery cells from each other. The partition wall has a through-hole provided therein. The through-hole opens at a position facing the exhaust passage provided in the battery holder. The exhaust passage provided in each of the battery blocks and the through-hole provided in the partition wall are arranged on a straight line and form an exhaust duct for the exhaust gas in the core pack while the battery blocks are coupled to one another. The exterior case is configured to cause the exhaust gas discharged from the valve-side end surface arranged at the first end of the core pack to pass through the exhaust duct and to be discharged from the exhaust portion to an outside of the exterior case.

The battery pack described above eliminates adverse effects caused by the high-temperature exhaust gas ejected from the opened discharge valve, thus ensuring high safety. This is because the above battery pack causes the high-temperature exhaust gas ejected from the discharge valve to pass through the exhaust duct formed by the exhaust passage passing through the battery holder and the through-hole formed in the partition wall, and then exhausts the exhaust gas from the exhaust portion provided in the exterior case to outside. In particular, since the exhaust duct is configured by linearly coupling the exhaust passages opening in the longitudinal direction of the battery holder, the exhaust duct efficiently cools down the passing high-temperature exhaust gas as a long flow path as a whole. Thus, in the battery pack, the exhaust gas having high temperature and high energy discharged from the discharge valve passes through the exhaust duct, thereby being ideally cooled down to effectively reduce thermal energy, and the adverse effect caused by the high-temperature exhaust gas is eliminated.

A battery pack of a second exemplary embodiment of the present invention may further include a heat-resistant cap coupled to the first end of the core pack. The heat-resistant cap includes a closing plate portion facing an end surface of each of the battery blocks, and a peripheral wall portion connected to a periphery of the closing plate portion and an outer peripheral surface of each of the battery blocks. The battery pack is configured to cause the exhaust gas discharged from the discharge valve of the each of the battery cells to be redirected by causing the exhaust gas to collide with the closing plate portion at the first end of the core pack and to flow to the exhaust duct.

In the battery pack described above, the exhaust gas with high temperature and high energy ejected from the discharge valve collides with the closing plate portion of the heat-resistant cap to reduce its energy, and the exhaust gas having the reduced energy is redirected to pass through the exhaust duct, so that the energy of the exhaust gas discharged from the discharge valve may be efficiently reduced. Since the heat-resistant cap couples the peripheral wall portion provided along the periphery of the closing plate portion to the outer peripheral surface of the battery block, the exhaust gas ejected from the discharge valve is effectively prevented from leaking to the outside of the heat-resistant cap, and efficiently flows into the exhaust duct.

In a battery pack of a third exemplary embodiment of the present invention, the heat-resistant cap is made of reinforced plastic containing resin and inorganic material embedded in the resin for reinforcement of the resin.

The above configuration improves heat resistance of the heat-resistant cap, and prevents the heat-resistant cap effectively from being melted by the high-temperature exhaust gas discharged from the discharge valve of the battery cell. The exterior case of the battery pack is effectively prevented from being melted and from discharging the high-temperature exhaust gas to outside.

In a battery pack of a fourth exemplary embodiment of the present invention, the battery holder includes holding tubes holding the battery cells. The holding tubes are arranged in multiple stages and multiple rows, and constitute demarcation walls intersecting each other between the holding tubes so as to providing the exhaust passage at centers of the demarcation walls.

In the above configuration, the battery holder has a structure in which the holding tubes that holds the battery cells is arranged in multiple stages and multiple rows, and the exhaust passage is formed at centers of the demarcation walls intersecting each other between the holding tubes. The exhaust passage is formed at a center of the battery holder while having a structure in which the battery cells are held in parallel at predetermined positions.

In a battery pack of a fifth exemplary embodiment of the present invention, the battery holder includes a demarcation wall with a cross shape. The battery cells are four battery cells which are cylindrical batteries arranged in two rows and two stages. The demarcation wall is provided between the holding tubes arranged vertically and horizontally and constitutes the exhaust passage at a center of the demarcation wall.

In the above configuration, the exhaust passage is provided at the center of the cross-shaped demarcation wall formed between the four battery cells while the four cylindrical batteries are arranged at predetermined positions. This structure provides the exhaust passage having a large opening area at a dead space formed between the cylindrical batteries. The exhaust passage having a wide opening area as described above allows the exhaust gas to smoothly flow to be efficiently cooled.

In a battery pack of a sixth exemplary embodiment of the present invention, a cross section of the exhaust passage has a rectangular shape. Four corners of the rectangular shape of the exhaust passage are close to the holding tubes of the battery holder.

In the above configuration, the cross-sectional shape of the exhaust passage is rectangular and the four corners are close to the holding tubes. This structure reduces the influence of heat of the high-temperature exhaust gas flowing into the exhaust passage on the surrounding battery cells.

In a battery pack of a seventh exemplary embodiment of the present invention, the exterior case includes a surface plate portion facing the core pack. The surface plate portion provides an expansion gap for the exhaust gas between the surface plate portion and the core pack. The exterior case is configured to cause the exhaust gas passing through the exhaust duct to pass through the expansion gap and to be discharged from the exhaust portion to an outside of the exterior case.

In the above configuration, the exhaust gas that has passed through the exhaust duct passes through the expansion gap formed between the core pack and the surface plate portion of the exterior case and is discharged from the exhaust portion to the outside. This structure allows the exhaust gas with energy reduced by passing through the exhaust duct to be discharged to the outside by further reducing the energy in the expansion gap.

In a battery pack of an eighth exemplary embodiment of the present invention, the exhaust portion is provided at the surface plate portion at an end of the exterior case facing the first end of the core pack.

The above configuration reliably reduces the energy of the exhaust gas exhausted from the exhaust portion while having a structure in which the exhaust portion is provided in the surface plate portion at the end of the exterior case facing the first end of the core pack. In this structure, while the first end of the core pack where the discharge valve of the battery cell is arranged and the exhaust portion provided in the surface plate portion are arranged close to each other, the exhaust gas is bypassed to the exhaust duct thereby lengthening the exhaust path, and thus the exhaust gas is discharged while its energy is reliably reduced.

In a battery pack of a ninth exemplary embodiment of the present invention, the plurality of battery cells are cylindrical batteries having respective end surfaces arranged on a same plane. The cylindrical batteries are arranged in the battery holder in parallel to one another to constitute each battery block.

In a battery pack of a tenth exemplary embodiment of the present invention, the battery cells are cylindrical batteries having respective end surfaces arranged on a same plane. The cylindrical batteries are arranged in the battery holder in parallel to one another to constitute each battery block.

Exemplary embodiments of the present invention will be detailed below with reference to the drawings. Note that, in the following description, terms (for example, “top”, “bottom”, and other terms including those terms) indicating specific directions or positions are used as necessary; however, the use of those terms is for facilitating the understanding of the invention with reference to the drawings, and the technical scope of the present invention is not limited by the meanings of the terms. Furthermore, parts denoted by the same reference mark in a plurality of drawings indicate an identical or equivalent parts or members.

Further, the following exemplary embodiments illustrate specific examples of the technical concept of the present invention, and the present invention is not limited by the following exemplary embodiments. In addition, unless otherwise specified, dimensions, materials, shapes, relative arrangements, and the like of the constituent elements described below are not intended to limit the scope of the present invention, but are intended to be illustrative. Further, the contents described in one exemplary embodiment and one working example are also applicable to other exemplary embodiments and working examples. Furthermore, the sizes and positional relationships of members illustrated in the drawings may be exaggerated in order to clarify description.

Figure 2:
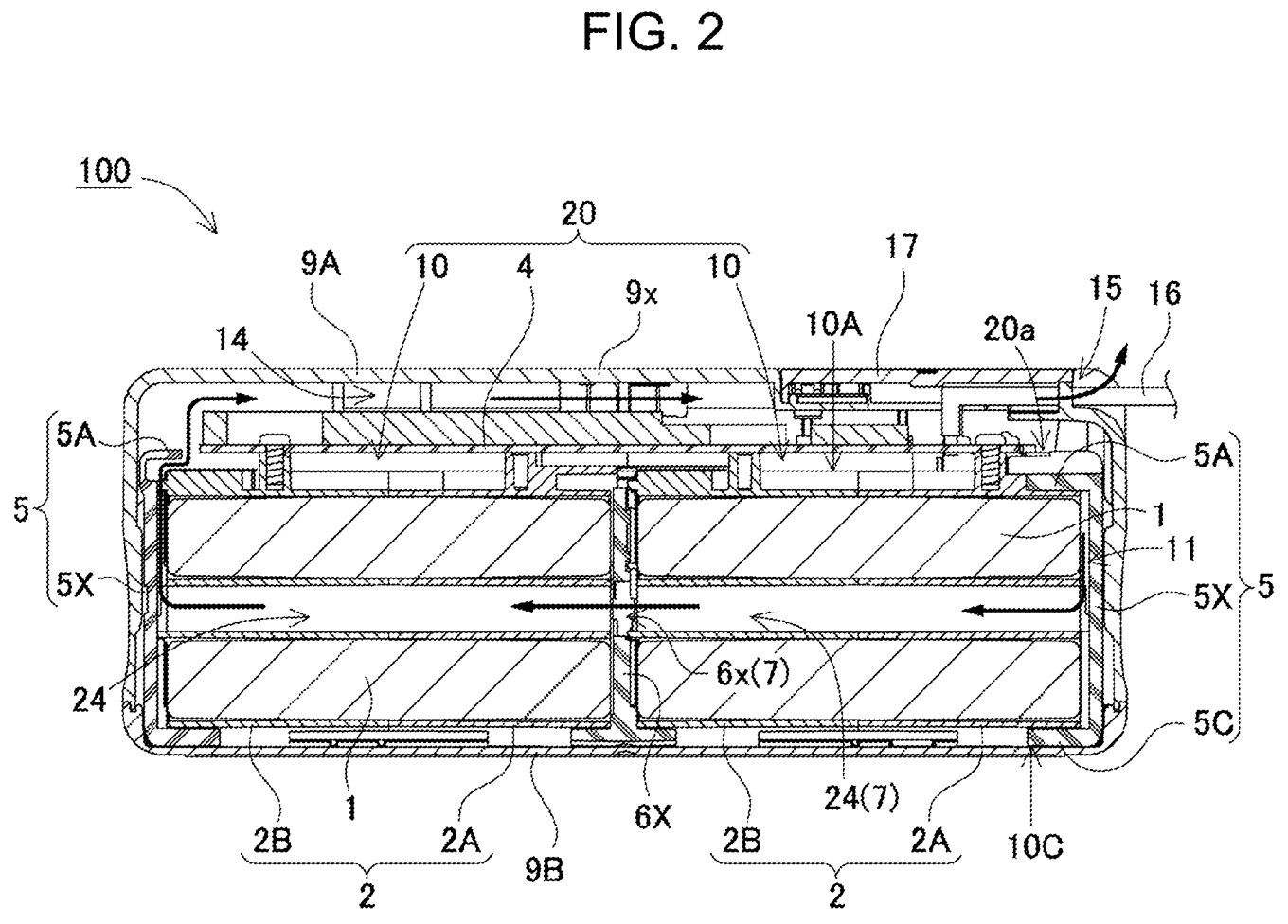
Figure 3:
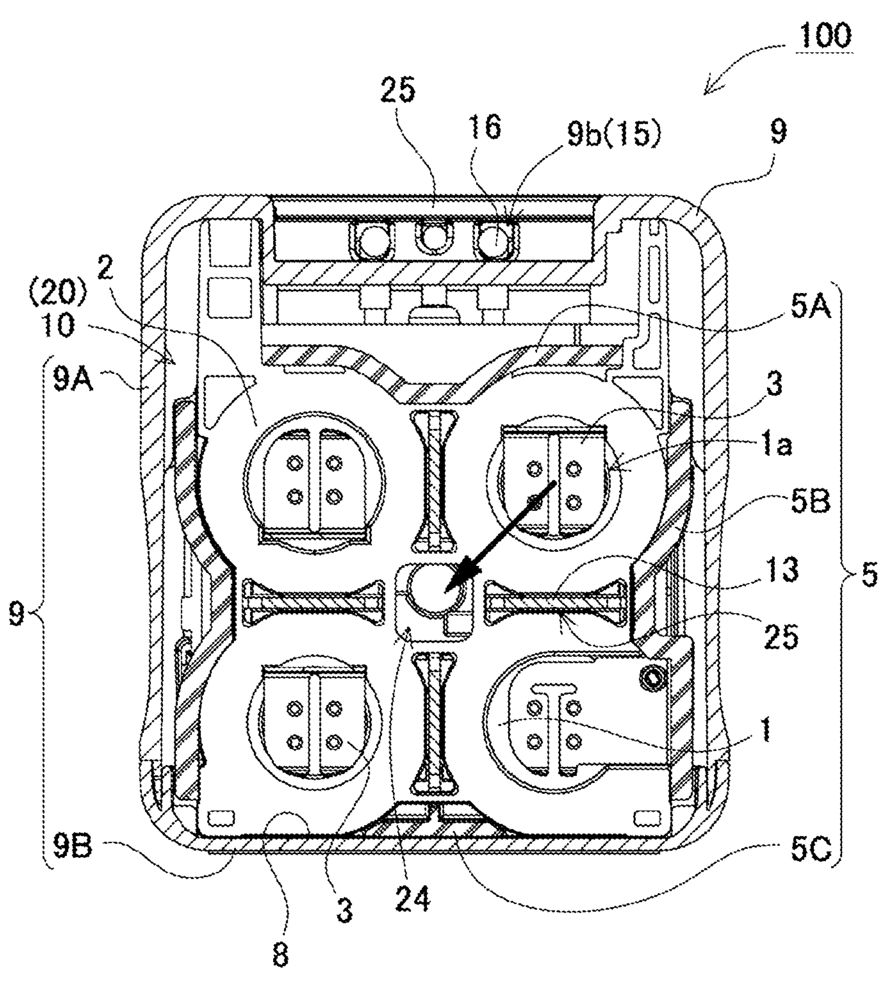
FIG. 3 is a vertical transverse sectional view of the battery pack illustrated in FIG. 1.
Figure 4:
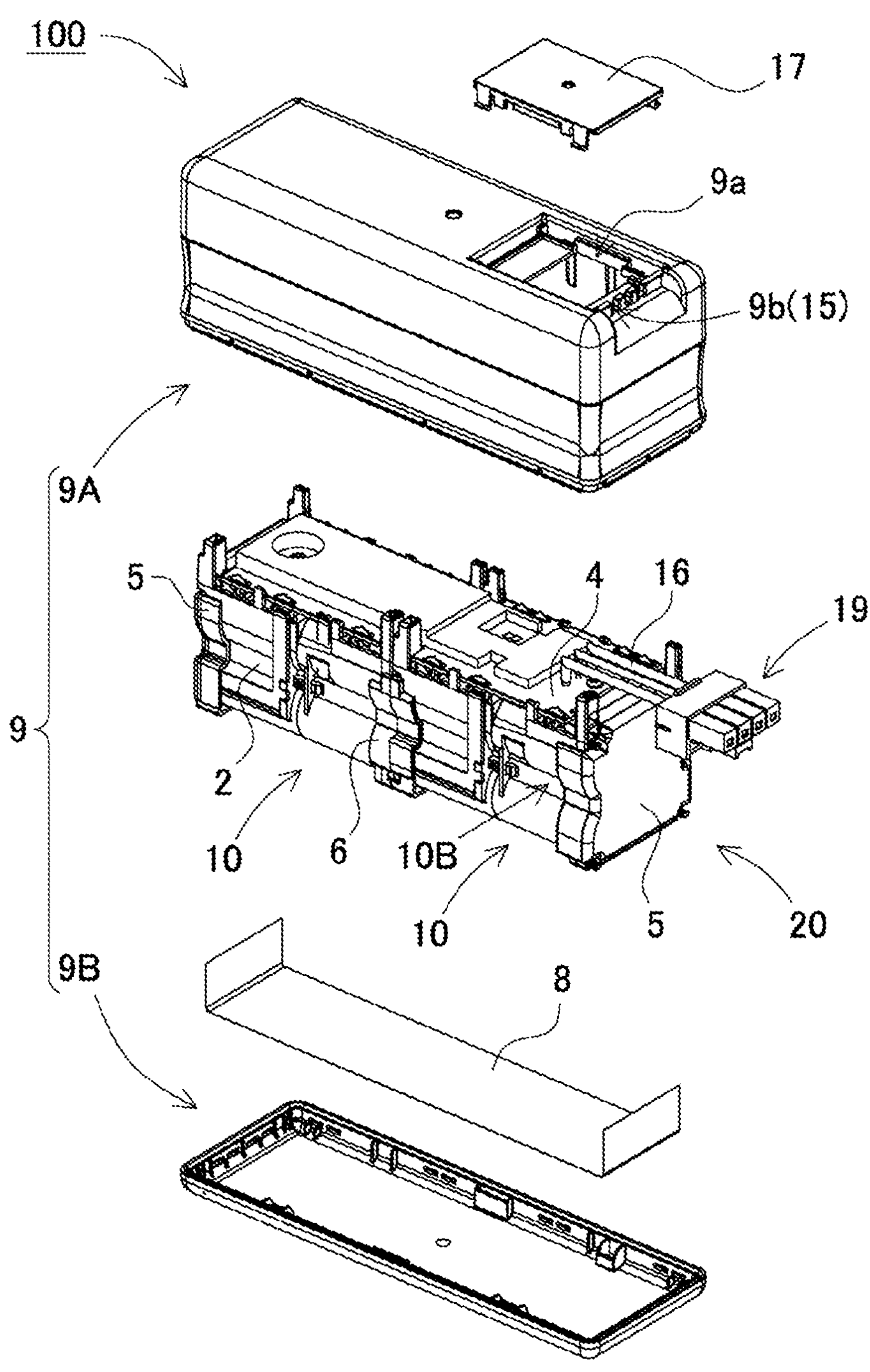
FIG. 4 is an exploded perspective view of the battery pack illustrated in FIG. 1.
Figure 5:
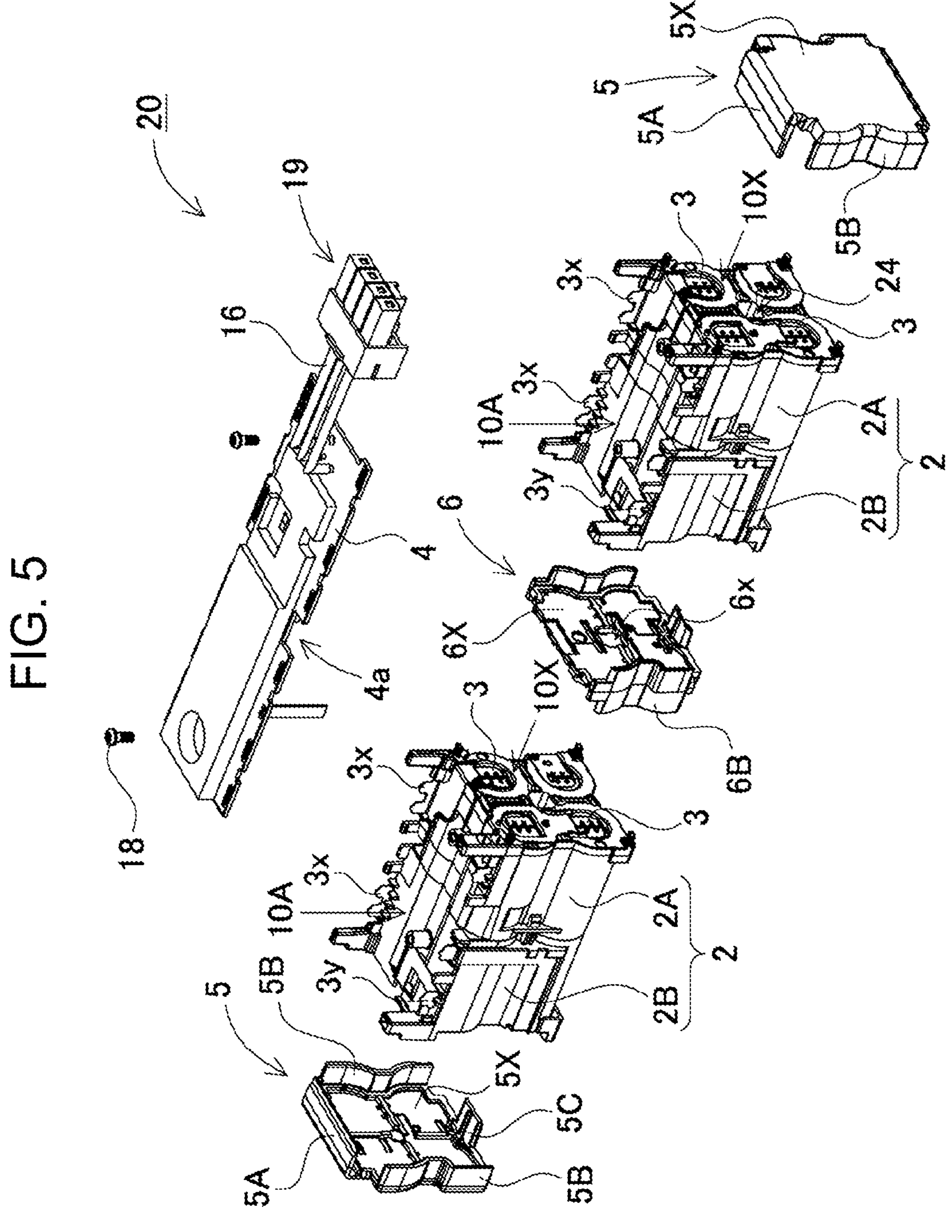
FIG. 5 is an exploded perspective view of a core pack of the battery pack illustrated in FIG. 4.
Figure 6:
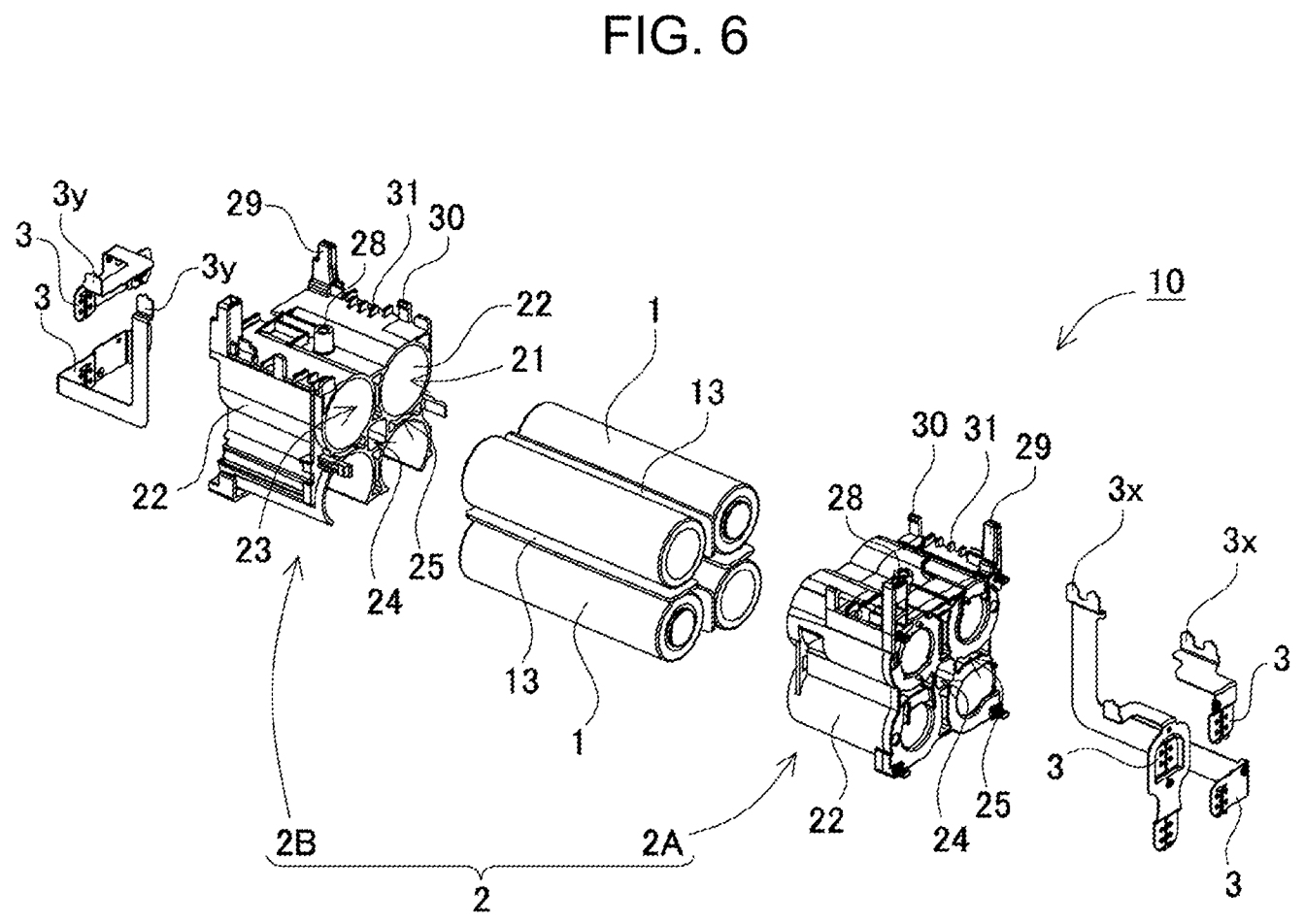

FIGS. 1 to 6 illustrate a battery pack according to an exemplary embodiment of the present invention. FIG. 1 is a perspective view of a battery pack. FIG. 2 is a vertical longitudinal sectional view of the battery pack. FIG. 3 is a vertical transverse sectional view of the battery pack. FIG. 4 is an exploded perspective view of the battery pack. FIG. 5 is an exploded perspective view of a core pack of the battery pack. FIG. 6 is an exploded perspective view of the battery block.

Battery pack 100 illustrated in FIGS. 1 to 6 includes plural battery blocks 10 and exterior case 9. Each of battery blocks 10 includes plural battery cells 1 arranged at predetermined positions by battery holder 2. Exterior case 9 accommodates therein core pack 20 including battery blocks 10 coupled to one another in an axial direction of battery cells 1. Core pack 20 illustrated in the drawings further includes heat-resistant cap 5 coupled to first end 20*a* of the core pack, partition wall 6 arranged between battery blocks 10 coupled to each other to insulate opposing battery cells 1 from each other, and circuit board 4 arranged along first surface 10A of battery block 10 and coupled to battery block 10.

Battery pack 100 is used, for example, as a power source of a portable electric device, such as a vacuum cleaner. The present invention may be used also as a power source of other electric devices, such as an electric power tool, a power-assisted bicycle, and the like without specifying an electric device as a use of the battery pack. The battery pack may be structured to be detachably coupled to an electric device, or may be incorporated non-detachably in an electric device.

Battery Cell 1

Battery cell 1 is a cylindrical battery having end surface 1*a* provided with a discharge valve configured to open when an internal pressure of the battery exceeds a predetermined pressure. Each cylindrical battery includes a cylindrical metal case accommodates therein electrodes and an electrolytic solution. The metal case has a sealed structure in which a sealing plate is hermetically fixed to an opening portion of a cylindrical package can with a closed bottom. The package can is fabricated by pressing a metal plate into a cylindrical shape. The sealing plate is crimped and hermetically fixed to a peripheral edge of the opening portion of the package can with a packing made of insulating material interposed between the sealing plate and the package can.

Although not illustrated, a discharge valve is provided on the sealing plate of battery cell 1 in order to prevent damage due to an abnormally high internal pressure of the metal case. In battery cell 1, an opening portion of the discharge valve that opens and discharges internal gas or the like is provided in the sealing plate. In battery cell 1, the discharge valve and the opening portion may be provided at the bottom of the package can. The discharge valve is configured to open when the internal pressure rises more than a predetermined pressure, for example, 1.5 MPa, and prevents the metal can from such a breakage due to the increase of the internal pressure. The discharge valve is configured to open in an abnormal state. Accordingly, when the discharge valve opens, a temperature of battery cell 1 is very high. The gas and the electrolytic solution (ejected matter) discharged from the opened discharge valve have an abnormally high temperature accordingly. Particularly in a battery pack in which battery cell 1 is a non-aqueous electrolyte secondary battery, such as a lithium ion battery, exhaust gas has an abnormally high temperature higher than 400° C. Furthermore, each of the lithium ion batteries is filled with a non-aqueous electrolytic solution. When this solution is discharged to the outside of the case at high temperature, this solution may contact air and catches fire, and reaches a more abnormally high temperature. In not only the lithium ion battery but also other chargeable batteries, since the exhaust gas ejected from the opened discharge valve has a high temperature, the energy of the exhaust gas is to be reduced and the exhaust gas is to be discharged to the outside of the case for enhancing safety.

Battery Block 10

As illustrated in FIG. 6, battery block 10 includes battery cells 1 arranged in parallel to one another via battery holder 2 made of plastic between the battery cells. In illustrated battery block 10, four battery cells 1 are arranged in two rows and two stages in battery holder 2. In illustrated battery block 10, four battery cells 1 are arranged in two rows and two stages, and are connected in series to one another via lead plates 3. In battery block 10 illustrated in the drawing, four battery cells 1 are arranged in two rows and two stages and connected in series to one another. However, the number and connection of battery cells 1 may be arbitrarily changed. Each of battery blocks 10 may be commonly produced by arranging battery cells 1 with the same outer shape, for example, cylindrical batteries with the same dimensions at fixed positions in battery holder 2 with the same shape and connecting battery cells 1 by lead plates 3 with the same shape. Battery blocks 10 made of all common components may be mass-produced inexpensively.

Battery Holder 2

In battery holder 2 shown in FIGS. 5 and 6, battery cells 1 are arranged in parallel to one another with a terminal surface of the batteries at respective both ends arranged on the same plane. Battery holder 2 arranges battery cells 1 in multiple stages and multiple rows. Battery holder 2 in the drawings is molded from plastic into a shape including holding tubes 22 in which four battery cells 1 are arranged at predetermined positions. Battery holder 2 has a shape in which four holding tubes 22 are coupled in parallel in two rows and two stages. Insides of holding tubes 22 are substantially equal to outer shapes of battery cells 1 to form holding part 21.

In battery block 10 illustrated in FIG. 6, battery holder 2 is divided in a longitudinal direction of battery cells 1 into first battery holder 2A and second battery holder 2B. Battery holder 2 allows smooth insertion of elongated battery cells 1. First battery holder 2A and second battery holder 2B are separately manufactured by molding plastic, and are coupled to each other after battery cells 1 are inserted into the holders. First battery holder 2A and second battery holder 2B include respective cylindrical holding tubes 22 for inserting cylindrical battery cells 1 into the tubes and arranging the battery cells at the predetermined positions. An inner shape of each holding tube 22 is substantially identical to an outer shape of battery cell 1. The inner shape of each holding tube 22 is slightly larger than the outer shape of battery cell 1 to smoothly insert and arrange battery cells 1 at the predetermined positions. First battery holder 2A and second battery holder 2B of this structure are coupled to each other at a predetermined position while battery cells 1 are disposed between the holders in a state where both ends of cylindrical battery cells 1 are inserted into the holders. First battery holder 2A and second battery holder 2B may have opposing surfaces configured to be engaged with each other to be more accurately coupled to each other, and are also coupled together at predetermined positions with a unmeltable plate described later interposed between the holders. First battery holder 2A and second battery holder 2B which are coupled to each other with battery cells 1 interposed between the holders are coupled to circuit board 4 and are held to be coupled each other.

Battery block 10 illustrated in FIGS. 3 and 6 has holding tubes 22 arranged between adjacent battery cells 1 as demarcation walls 23, and unmeltable plates 13, such as mica plates, disposed between demarcation walls 23. In battery holder 2 in the drawings, since battery cells 1 are arranged in two rows and two stages, demarcation wall 23 with a cross shape is provided among four battery cells 1 arranged vertically and horizontally. Demarcation walls 23 provides insertion gaps 25 therebetween into which unmeltable plates 13 is inserted. Demarcation walls 23 have unmeltable plates 13, such as mica plates, inserted in insertion gaps 25. Battery block 10 prevent thermal runaway from being induced in adjacent battery cells 1 while any one of battery cells 1 causes thermal runaway and generates abnormal heat.

Exhaust Passage 24

Battery block 10 includes exhaust passage 24 passing through battery holder 2 and extends in the longitudinal direction of battery cell 1. Battery holder 2 includes plural holding tubes 22 that hold battery cells 1. Holding tubes 22 are arranged in multiple stages and multiple rows. Demarcation walls 23 intersecting each other are provided between holding tubes 22 such that exhaust passage 24 is provided at centers of demarcation walls 23. In battery holder 2 illustrated in FIGS. 3 and 6, cylindrical holding tubes 22 accommodating cylindrical batteries therein are arranged in multiple rows and two rows in the drawings, demarcation wall 23 with a cross shape is provided among holding tubes 22 arranged vertically and horizontally. Exhaust passage 24 is provided at a center of the cross shape of demarcation wall 23. This structure provides a large opening area of exhaust passage 24 by effectively utilizing a dead space among the cylindrical batteries. Exhaust passage 24 has a large volume to allow the exhaust gas discharged from the discharge valve of battery cell 1 to smoothly flow therein.

Exhaust passage 24 illustrated in FIG. 3 is provided as a through-hole with a rectangular columnar shape extending in the longitudinal direction of battery cells 1 at a center of demarcation wall 23 with the cross shape. In battery holder 2, a cross-section of exhaust passage 24 has a rectangular shape. Four corners of the rectangular shape of exhaust passage 24 are close to holding tubes 22. In this structure, since the cross section of exhaust passage 24 has a rectangular shape and the four corners thereof are close to holding tubes 22, it is possible to reduce the influence on battery cells 2 by heat of the high-temperature exhaust gas flowing into exhaust passage 24. The cross sectional shape of the exhaust passage may not necessarily be a rectangular shape, and may be a circular shape, an elliptical shape, a polygonal shape, or the like.

Partition Wall 6

Partition wall 6 is disposed between battery blocks 10 arranged side by side in the longitudinal direction. In core pack 20 illustrated in FIG. 5, two battery blocks 10 are linearly coupled to each other. Partition wall 6 is arranged between opposing battery blocks 10 to insulate the battery blocks from each other. Partition wall 6 is produced by molding a material having excellent insulating properties and heat insulating properties, for example, a PBT resin which is a fiber-reinforced plastic including inorganic fiber, such as glass fiber, embedded therein for reinforcing the plastic. Partition wall 6 illustrated in the drawings includes insulation plate part 6X that insulates opposing battery cells 1 from each other, and peripheral wall portion 6B that is coupled to a periphery of insulation plate part 6X and is coupled to an outer peripheral surface of the battery block. Partition wall 6 is coupled to predetermined positions of battery blocks 10 by arranging peripheral wall portion 6B along the outer peripheral surfaces of battery blocks 10 arranged on both sides of insulation plate part 6X.

Partition wall 6 illustrated in the drawings has through-hole 6*x* opening at a center of insulation plate part 6X. Through-hole 6*x* is provided at a position facing the exhaust passage provided in battery block 10 adjacent to the partition wall. Since exhaust passage 24 illustrated in the drawings has a rectangular shape, through-hole 6*x* of partition wall 6 also has a rectangular shape and opens with a size substantially equal to that of exhaust passage 24.

In core pack 20 described above, exhaust passages 24 formed in respective battery blocks 10 and through-hole 6*x* formed in partition wall 6 are arranged on a straight line while battery blocks 10 are aligned in the longitudinal direction and linearly coupled to each other, thereby constituting exhaust duct 7 for the exhaust gas. Exhaust duct 7 passes through core pack 20 in the axial direction, and the exhaust gas discharged from valve-side end surface 1*a* arranged at first end 20*a* passes to reduce its energy. As described above, exhaust duct 7 composed of exhaust passages 24 which are coupled to one another and pass though battery blocks 10 in the longitudinal direction may have a long overall length, and effectively cool the exhaust gas passing through an inside of exhaust duct 7.

Heat-Resistant Cap 5

In battery pack 100 illustrated in FIGS. 2 to 5, heat-resistant cap 5 is coupled to an end of core pack 20 in order to reduce energy of the exhaust gas ejected from the discharge valve of battery cell 1 arranged at first end 20*a* of core pack 20 and discharge the gas. Heat-resistant cap 5 is manufactured by molding thermoplastic plastic having heat resistance characteristics superior to those of battery holder 2 and exterior case 9. For example, a PBT resin or the like, which is a fiber-reinforced plastic including inorganic fibers, such as glass fibers, embedded therein for reinforcing is molded and produced as a plastic excellent in heat resistance characteristics. Heat-resistant cap 5 coupled to the end of battery block 10 reduces energy of exhaust gas ejected from a valve-side end surface of battery cell 1, and changes a flow direction. Heat-resistant cap 5 includes closing plate portion 5X facing end surface 10X of battery block 10, and peripheral wall portions 5A, 5B, and 5C coupled to a periphery of closing plate portion 5X. Closing plate portion 5X and peripheral wall portions 5A, 5B, 5C are unitarily molded into an integral structure.

Closing plate portion 5X provides discharge gap 11 between closing plate portion 5X and end surface 10X of battery block 10 in order to allow the exhaust gas ejected from the discharge valve to efficiently flow into exhaust duct 7. Closing plate portion 5X causes the exhaust gas ejected from the discharge valve to collide with an inner surface in discharge gap 11 to reduce energy. Discharge gap 11 provided between closing plate portion 5X and end surface 10X of battery block 10, more precisely, between closing plate portion 5X and end surface 1*a* of battery cell 1 has a size, for example, 0.5 mm or more and 3 mm or less so as to reduce energy of movement of the exhaust gas while smoothly exhausting the exhaust gas. Lead plate 3 fixed to battery cell 1 is arranged in discharge gap 11.

The exhaust gas ejected into discharge gap 11 is weakened by closing plate portion 5X and flows into exhaust passage 24. Heat-resistant cap 5 redirects the exhaust gas ejected into discharge gap 11 and causes the exhaust gas to flow into exhaust passage 24. Heat-resistant cap 5 causes the exhaust gas ejected into discharge gap 11 to collide with closing plate portion 5X to reduce energy, and redirects the gas to flow into exhaust passage 24 without scattering to surroundings.

Heat-resistant cap 5 illustrated in FIGS. 3 and 5 includes peripheral wall portions 5A, 5B, and 5C coupled to the periphery of closing plate portion 5X and coupled to the outer peripheral surface of battery block 10. Heat-resistant cap illustrated in the drawings includes peripheral wall portion 5A facing first surface 10A (an upper surface in the drawings) as an outer peripheral surface of battery block 10, peripheral wall portion 5B coupled to second surface 10B (both side surfaces in the drawings) of battery block 10, and peripheral wall portion 5C coupled to third surface 10C (a bottom surface in the drawings) of battery block 10. Heat-resistant cap 5 is coupled to a predetermined position on an end of battery block 10 while peripheral wall portions 5A, 5B, and 5C securely contact outer peripheral surfaces of battery block 10. Heat-resistant cap 5 including peripheral wall portions 5A, 5B, and 5C securely contacting the outer peripheral surface of battery block 10 prevents the exhaust gas ejected into discharge gap 11 from leaking to the periphery of battery block 10, and reliably guides the exhaust gas to exhaust passage 24.

Lead Plates 3

Battery cells 1 of battery blocks 10 are electrically connected in series via lead plates 3. Lead plate 3 is formed by bending a metal plate having excellent conductivity. Lead plates 3 are welded and fixed to electrodes provided on the end surfaces of battery cells 1. In battery block 10 illustrated in FIG. 6, battery cells 1 are connected in series to each other by lead plates 3 to increase an output voltage. However, battery block 10 may have battery cells 1 connected in parallel by lead plates 3 or may have battery cells 1 connected in series and in parallel by lead plates 3. Lead plates 3 connecting battery cells 1 to each other are connected to circuit board 4.

Circuit Board 4

Circuit board 4 has a protection circuit mounted thereon. The protection circuit charges and discharges battery cells 1. Circuit board 4 connects battery cells 1 to the protection circuit. The protection circuit is configured to detect the voltage and current of each battery cell 1 and controls the current for charging and discharging the cells to protect the battery while charging/discharging. Circuit board 4 is connected to output lead part 3*x* for inputting positive or negative output of each battery block 10, or is connected to intermediate potential lead part 3*y* for measuring intermediate potential in order to detect a voltage of each battery cell 1. In addition, circuit board 4 may be connected to potential of a temperature detector (not illustrated) for detecting a temperature of each battery cell 1. The temperature detector may be implemented by a thermistor or the like.

Circuit board 4 is arranged along first surface 10A (upper surface in the drawings) of battery block 10 adjacent to end surface 10X of battery block 10 on which heat-resistant cap 5 is arranged thereon. Circuit board 4 is arranged to provide a gap formed between circuit board 4 and first surface 10A of battery block 10.

Circuit board 4 is coupled to a predetermined position on first surface 10A of battery block 10. In order to couple circuit board 4 at the predetermined position, battery holder 2 illustrated in the perspective view of FIG. 6 includes fitting projections 29 projecting on a facing surface (the upper surface in the diagram) battery holder 2 facing circuit board 4. Fitting projections 29 are hollow columnar bosses that vertically project upward from four corner portions of the facing surface of battery holder 2, and are unitarily molded with the plastic of battery holder 2. As illustrated in FIG. 4, fitting projections 29 guide fitting recesses 4*a* provided in circuit board 4 to arrange circuit board 4 at a predetermined position. Battery holder 2 illustrated in FIG. 6 further includes mounting ribs 31 unitarily molded for mounting circuit board 4 thereon at plural positions on the facing surface of the battery holder and specifying the vertical position of circuit board 4. Mounting ribs 31 are provided at plural positions on both sides of the facing surface of battery holder 2, and arrange circuit board 4 at a predetermined position and at a predetermined interval with respect to first surface 10A. Further, battery block 10 shown in FIG. 6 includes locking hooks 30 for circuit board 4 unitarily molded and provided on the facing surface of battery holder 2. As illustrated in FIG. 4, locking hooks 30 lock circuit board 4 arranged on first surface 10A and arranges the circuit board at the predetermined position. In circuit board 4, output lead parts 3x and intermediate potential lead parts 3y projecting from first surfaces 10A of battery blocks 10 are inserted into through-holes in circuit board 4, fitting projections 29 of battery holders 2 are guided to fitting recess portion 4a, a bottom surface of the board is placed on mounting ribs 31 and arranged at the predetermined position, so that circuit board 4 is locked by locking hooks 30 and arranged at the predetermined position. While circuit board 4 is positioned at the predetermined position by locking hooks 30, output lead parts 3x and intermediate potential lead parts 3y are soldered to connection parts of circuit board 4 to couple battery blocks 10.

Circuit board 4 illustrated in the drawings couples battery blocks 10 to one another, electrically connect battery blocks 10 to one another, and further physically couples battery blocks 10 to one another. In battery pack 100 illustrated in the exploded perspective view of FIG. 5, circuit board 4 is fixed to two battery blocks 10 with screws 18 passing through circuit board 4 to further firmly couple battery blocks 10. Battery blocks 10 each include fixing boss 28 into which screw 18 are to be screwed on the facing surface of battery holder 2.

Output lead parts 3x of each battery block 10 are connected with circuit board 4 and further connected to connector 19. Circuit board 4 includes a conductive layer (not illustrated), such as a copper foil, at the surface thereof. The conductive layer electrically connects connection parts of output lead parts 3x in series to connect battery blocks 10, and connects output lead parts 3x to lead wire 16 of connector 19. The conductive layer connects connection parts of intermediate potential lead parts 3y to the protection circuit of circuit board 4.

As described above, battery blocks 10 are fixed to circuit board 4 while being linearly coupled to form core pack 20 of the battery pack. In core pack 20 illustrated in the drawings, two battery blocks 10 are linearly coupled to each other. Partition wall 6 is arranged between opposing battery blocks 10 to insulate battery blocks 10 from each other. Heat-resistant cap 5 is coupled to both ends of the core pack. Circuit board 4 is coupled to first surface 10A of battery block 10.

Exterior Case 9

Exterior case 9 has a rectangular tubular box shape as illustrated in FIGS. 1 to 4. Exterior case 9 illustrated in the drawings is divided into two parts, case body 9A and closing part 9B. As illustrated in FIG. 3, core pack 20 of a battery including two sets of battery blocks 10, heat-resistant cap 5, partition wall 6. Circuit board 4 is accommodated inside exterior case 9. Exterior case 9 includes connector 19 drawn to the outside for connecting with an electric device to be powered by battery pack 100. Exterior case 9 is made of a material having excellent electrical insulating properties and thermal insulating properties, such as polycarbonate, ABS, or a resin obtained by combining them.

Exterior case 9 described above has exhaust portion 15 configured to discharge the exhaust gas discharged from the discharge valve to the outside. In exterior case 9 illustrated in the drawings, a portion that is an end of case body 9A and from which connector 19 is drawn out to the outside of the case is exhaust portion 15. Exterior case 9 has a structure in which open window 9a is provided in case body 9, and lead wire 16 is guided to groove 9b provided in an opening edge portion of open window 9a to draw out connector 19 to the outside of the case. Therefore, in the exterior case, open window 9a and groove 9b from which the lead wire is drawn out serve as the exhaust portion discharging the exhaust gas in the case to the outside. In exterior case 9, after connector 19 passes through open window 9a opening in case body 9A and core pack 20 of the battery is accommodated in case body 9A, case body 9A is closed by lid part 9B. After lead wire 16 passes through groove 9b provided in the peripheral edge portion of open window 9a, open window 9a of case body 9A is closed by closure lid 17.

In exterior case 9 illustrated in FIG. 2, case body 9A further includes surface plate portion 9x facing core pack 20 of the battery pack. In exterior case 9, expansion gap 14 of the exhaust gas is formed between circuit board 4 and surface plate portion 9x while core pack 20 of the battery pack is accommodated inside. Battery pack 100 allows the exhaust gas that has passed through exhaust duct 7 to pass through expansion gap 14 and discharges the exhaust gas from exhaust portion 15 to the outside. As described above, with the structure in which the exhaust gas that has passed through exhaust duct 7 passes through expansion gap 14 and is discharged from exhaust portion 15 to the outside, the exhaust gas with energy reduced in exhaust duct 7 is discharged to the outside by further reducing the energy in expansion gap 14.

Exterior case 9 illustrated in FIG. 2 further has exhaust portion 15 provided in surface plate portion 9x at the end of the case facing first end 20a of core pack 20. Battery pack 100 having the above structure reliably reduces the energy of the exhaust gas discharged from exhaust portion 15 while having a structure in which exhaust portion 15 is provided in surface plate portion 9x at the end of exterior case 9 facing first end 20a of core pack 20. In this structure, first end 20a of core pack 20 where the discharge valve of battery cell 1 is arranged and exhaust portion 15 provided in surface plate portion 9x are arranged close to each other. This structure allows the exhaust gas to bypass to exhaust passage 24, thereby reliably reducing the energy of the gas and discharging the gas. While the linear distance between the discharge valve of battery cell 1 and exhaust portion 15 of exterior case 9 is shortened, the path of the exhaust gas may be lengthened to reliably reduce the energy of the gas.

In the exterior case illustrated in FIG. 2, exhaust portion 15 is provided at the end of surface plate portion 9x of case body 9A on the same side as first end 20a of core pack 20, but exhaust portion 15 may be provided at a center or a side surface of surface plate portion 9x of case body 9A. In this structure, as indicated by arrows in FIGS. 2 and 3, the exhaust gas discharged from valve-side end surface 1a of battery cell 1 arranged at first end 20a of core pack 20 passes through exhaust duct 7 from discharge gap 11, passes through expansion gap 14 from exhaust duct 7, and is then discharged from exhaust portion 15 to the outside. As described above, in the battery pack of the present invention, the high-temperature exhaust gas passes through exhaust duct 7 passing through core pack 20, thereby reliably reducing the energy of the gas and discharging the gas to the outside while the path of the exhaust gas is lengthened. Further, battery pack 100 may discharge the exhaust gas to the outside while reducing the energy by lengthening the path of the exhaust gas also at the valve-side end surface of the battery cell arranged at a position other than first end 20a of core pack 20.

Heat Dissipation Plate 8

In battery pack 100 of FIG. 4, heat dissipation plate 8 is disposed on a lower surface of core pack 20 in order to more effectively reduce the energy of the exhaust gas. Heat dissipation plate 8 is arranged inside closing part 9B of exterior case 9 and between exterior case 9 and battery block 10, and reduces energy of exhaust gas ejected from battery cell 1. Heat dissipation plate 8 may be preferably made of a plate material having better thermal conduction characteristics than exterior case 9. Heat dissipation plate 8 is configured to absorb thermal energy of the colliding exhaust gas, quickly diffuse the absorbed thermal energy over a wide area to conduct the thermal energy to exterior case 9, and exterior case 9 dissipates the thermal energy to the outside over a wide area.

As a plate material having preferable thermal conduction characteristics, a metal plate is used for heat dissipation plate 8. In particular, an aluminum (including an aluminum alloy) plate is suitable as heat dissipation plate 8. Since the aluminum plate has heat resistance and excellent thermal conduction characteristics and is light, the thermal energy of the exhaust gas is quickly diffused and efficiently dissipated while reducing the weight. Battery pack 100 in FIG. 4 has a belt shape extended along the longitudinal direction of closing part 9B, and is arranged between heat-resistant cap 5 and exterior case 9 with both ends bent in an L shape. Thus, case coupling portions at both ends of exterior case 9 are covered from the inside, and the exhaust gas discharged from the discharge valve is prevented from being discharged to the outside from such portions.

INDUSTRIAL APPLICABILITY

A battery pack according to the present invention is suitably used for a battery pack used as a power source for portable electric devices, such as vacuum cleaners, electric tools, and power-assisted bicycles.

REFERENCE MARKS IN THE DRAWINGS

100 battery pack
1 battery cell
1*a* end surface
2 battery holder
2A first battery holder
2B second battery holder
3 lead plate
3*x* output lead part
3*y* intermediate potential lead part
4 circuit board
4*a* fitting recess
5 heat-resistant cap
5X closing plate portion
5A, 5B, 5C peripheral wall portion
6 partition wall
6X insulation plate part
6B peripheral wall portion
6*x* through-hole
7 exhaust duct
8 heat dissipation plate
9 exterior case
9A case body
9*a* open window
9*b* groove
9*x* surface plate portion
9B closing part
10 battery block
10X end surface
10A first surface
10B second surface
10C third surface
11 discharge gap
13 unmeltable plate
14 expansion gap
15 exhaust portion
16 lead wire
17 closure lid
18 set screw
19 connector
20 core pack
20*a* first end
21 holding part
22 holding tube
23 demarcation wall
24 exhaust passage
25 insertion gap
28 fixing boss
29 fitting projection
30 locking hook
31 mounting rib

The invention claimed is:

1. A battery pack comprising:

a plurality of battery blocks, each of the plurality of battery blocks including a plurality of battery cells and a battery holder positioning the plurality of battery cells at predetermined positions, each of the plurality of battery cells including a discharge valve configured to open when an internal pressure of the each of the battery cells exceeds a predetermined pressure;

an exterior case accommodating therein a core pack including the plurality of battery blocks coupled to one another in an axial direction of the plurality of battery cells; and a first heat-resistant cap and a second heat-resistant cap coupled to a first end and a second end of the core pack opposite to each other, respectively, wherein the exterior case has an exhaust portion through which exhaust gas is discharged from the discharge valve to an outside of the exterior case, the each of the plurality of battery blocks has an exhaust passage passing through the battery holder and extending between the plurality of battery cells in a longitudinal direction of the plurality of battery cells, a valve-side end surface of the each of the plurality of battery cells at which the discharge valve is disposed at the first end of the core pack, the core pack includes a partition wall provided between battery blocks coupled to one another, the partition wall insulating opposing battery cells out of the plurality of battery cells from each other, the partition wall has a through-hole provided therein, the through-hole opening at a position facing the exhaust passage provided in the battery holder, the exhaust passage provided in the each of the plurality of battery blocks and the through-hole provided in the partition wall are arranged on a straight line and form an exhaust duct for the exhaust gas in the core pack while the plurality of battery blocks are coupled to one another, the first heat-resistant cap includes:

a first closing plate portion facing one end surface of the each of the plurality of battery blocks; and a first peripheral wall portion connected to a periphery of the first closing plate portion and an outer peripheral surface of the each of the plurality of battery blocks, the second heat-resistant cap includes:

a second closing plate portion facing another end surface of the each of the plurality of battery blocks; and a second peripheral wall portion connected to a periphery of the second closing plate portion and an outer peripheral surface of the each of the plurality of battery blocks, the exterior case is configured to cause the exhaust gas discharged from the valve-side end surface arranged at the first end of the core pack:

to collide with the first closing plate portion of the first heat-resistant cap at the first end of the core pack, then;

to pass between the plurality of battery cells through the exhaust passage and the through-hole provided in the partition wall, then;

to collide with the second closing plate portion of the second heat-resistant cap at the second end of the core pack, and then;

to be discharged from the exhaust portion to an outside of the exterior case, the battery holder includes a plurality of holding tubes holding the plurality of battery cells, the battery holder includes a demarcation wall with a cross shape, the plurality of battery cells comprise four battery cells which are cylindrical batteries arranged in two rows and two stages, the demarcation wall is provided between the plurality of holding tubes arranged vertically and horizontally and constitutes the exhaust passage at a center of the demarcation wall, and a cross section of the exhaust passage has a rectangular shape, and four corners of the rectangular shape of the exhaust passage are close to the plurality of holding tubes of the battery holder.

2. The battery pack according to claim 1, wherein the heat-resistant cap is made of reinforced plastic containing resin and inorganic material embedded in the resin for reinforcement of the resin.

3. The battery pack according to claim 1, wherein the exterior case includes a surface plate portion facing the core pack, the surface plate portion providing an expansion gap for the exhaust gas between the surface plate portion and the core pack, and the exterior case is configured to cause the exhaust gas passing through the exhaust duct to pass through the expansion gap and to be discharged from the exhaust portion to an outside of the exterior case.

4. The battery pack according to claim 3, wherein the exhaust portion is provided at the surface plate portion at an end of the exterior case facing the first end of the core pack.

5. The battery pack according to claim 1, wherein the plurality of battery cells comprises a plurality of cylindrical batteries having respective end surfaces arranged on a same plane, and the plurality of cylindrical batteries are arranged in the battery holder in parallel to one another to constitute the each of the plurality of battery blocks.

6. The battery pack according to claim 5, wherein the plurality of battery cells are lithium ion batteries.

7. The battery pack according to claim 1, wherein the exhaust portion is provided closer to the first end of the core pack than to the second end of the core pack.

* * * * *